H. G. WILSON.
ICE CREAM CONE DISPENSER
APPLICATION FILED JAN. 6, 1920.

1,341,606.

Patented May 25, 1920.
3 SHEETS—SHEET 1.

WITNESS:
Benj. Kahn

INVENTOR.
H. G. Wilson
BY
Victor J. Evans ATTORNEY.

H. G. WILSON.
ICE CREAM CONE DISPENSER
APPLICATION FILED JAN. 6, 1920.

1,341,606.

Patented May 25, 1920.
3 SHEETS—SHEET 2.

WITNESS:
Benj. Kahn

INVENTOR.
H. G. Wilson
BY
Victor J. Evans ATTORNEY.

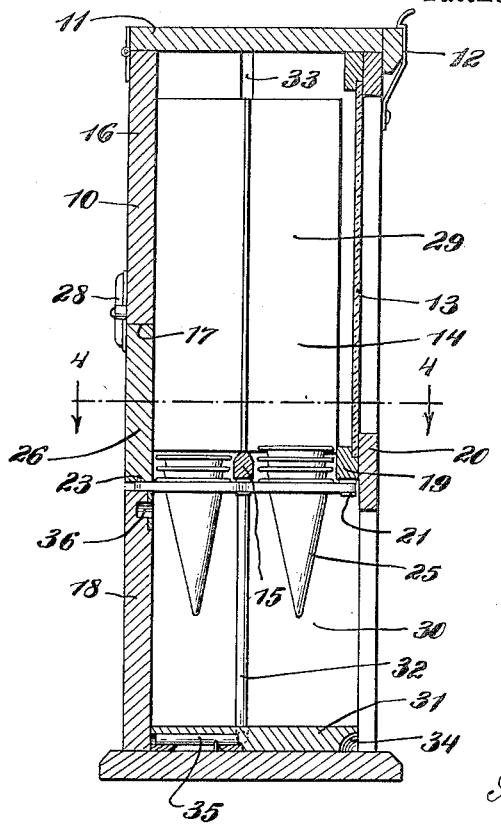
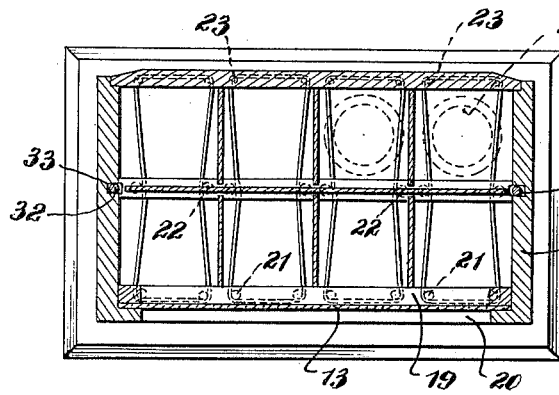
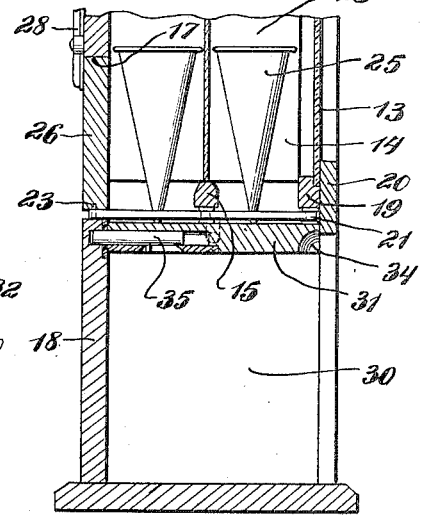

UNITED STATES PATENT OFFICE.

HAROLD G. WILSON, OF TITUSVILLE, FLORIDA.

ICE-CREAM-CONE DISPENSER.

1,341,606.            Specification of Letters Patent.      Patented May 25, 1920.

Application filed January 6, 1920. Serial No. 349,668.

*To all whom it may concern:*

Be it known that I, HAROLD G. WILSON, a citizen of the United States, residing at Titusville, in the county of Brevard and State of Florida, have invented new and useful Improvements in Ice-Cream-Cone Dispensers, of which the following is a specification.

The present invention has reference to an ice cream cone dispensing apparatus.

An object of the invention is to produce a device of this character in which the cones may be easily positioned, properly displayed, and held by elastic means to permit of the cones being separately withdrawn.

A further object of the invention is to produce an ice cream cone dispensing apparatus which includes an upper receptacle having a transparent front and in which receptacle the cones are received, the bottom of the receptacle having elastic supporting means which grip the lower cones and hold all of the cones in the compartment, but permitting the single withdrawal of the cones through the lower and open compartment, while means, in the nature of a slidable member is arranged in the lower compartment and is designed to be moved against the lower compartment to elevate the projecting ends of the cones and to close the said upper compartment when the cones are not to be dispensed, thus protecting the cones from dust, dirt or vermin.

It is a still further object of the invention to produce an ice cream cone dispensing apparatus which includes an upper compartment having a transparent face, a hinged door, and an open bottom which, however, has arranged thereon elastic supporting means for the cones and which, directly above the said supporting means is provided with a longitudinal dividing member, the arrangement being such that the carton in which the cones are originally received may, by opening the end thereof, be inserted into the upper compartment and then withdrawn after delivering the cones in the said compartment, the partition members of the carton holding the series of cones supported, and the elastic elements supporting the lowermost cones in a manner whereby the same may be withdrawn one by one through the lower and open compartment of the device.

It is a still further object of the invention to produce an ice cream cone dispensing apparatus in which elastic means are provided for supporting the cones to permit of the separate withdrawal of the cones, said means being in the nature of a plurality of independent continuous elastic elements so associated with the dispensing apparatus as to permit of the ready replacement of the same should the elasticity thereof become impaired or the said element become broken, one of the sustaining means for the elastic members being in the nature of a removable part of the dispenser which, when in place bears against the said elastic elements for retaining the same positioned and which, when removed permits free access to the said elements.

The foregoing objects, and others which will appear as the nature of the invention is better understood may be accomplished by a simple construction, combination and operative arrangement of parts such as is illustrated by the drawings.

In the drawings:—

Fig. 3 is an approximately central vertical transverse sectional view of the same.

Fig. 4 is a horizontal sectional view approximately on the line 4—4 of Fig. 3, the cones being removed.

Fig. 5 is a detail sectional view illustrating the manner in which the upper cone containing compartment is closed when the dispenser is not in use.

Figure 1:
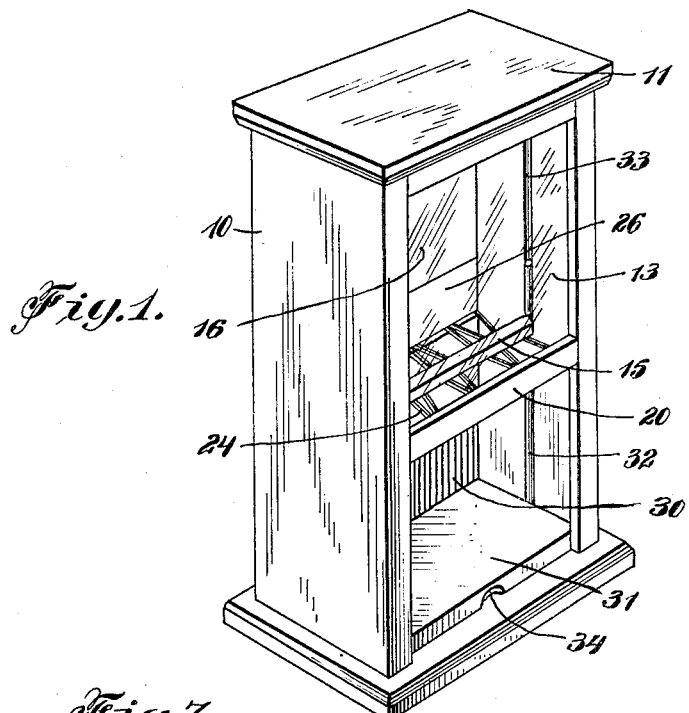
Figure 1 is a perspective view of the improvement.
Figure 7:
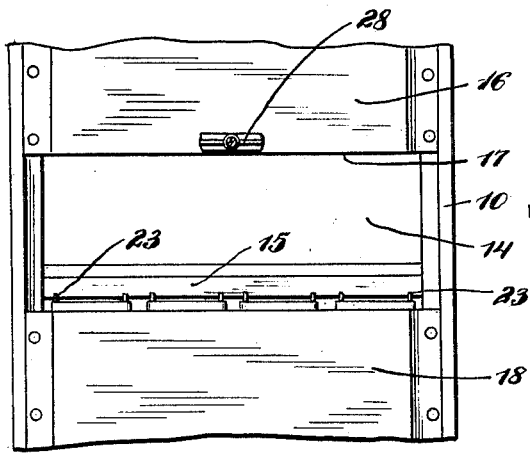
Fig. 7 is a fragmentary elevation looking toward the back of the dispenser with the back plate removed.
Figure 6:
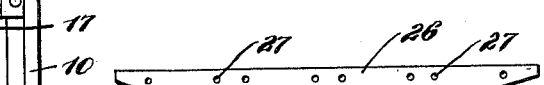
Fig. 6 is a bottom edge view of the removable back plate.
Figure 2:
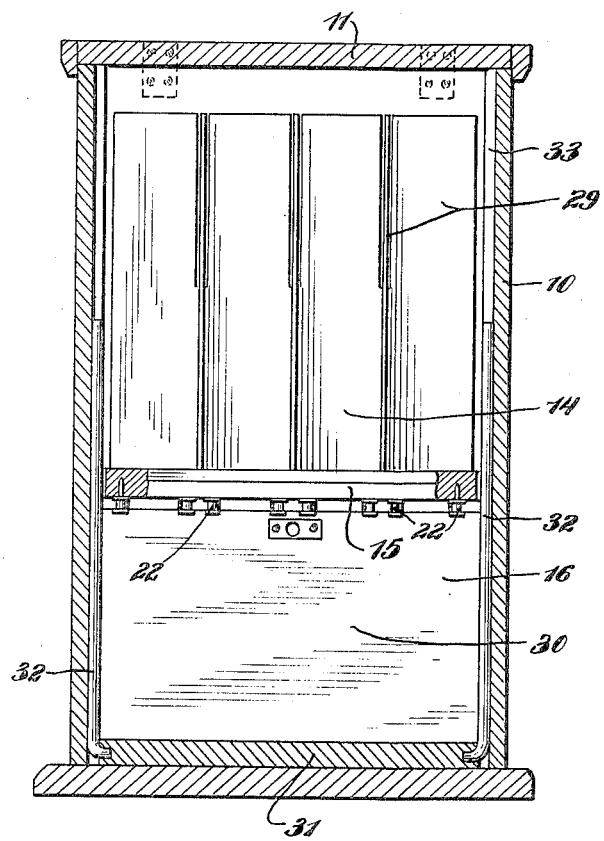
Fig. 2 is an approximately central vertical longitudinal sectional view of the same.
Figure 8:
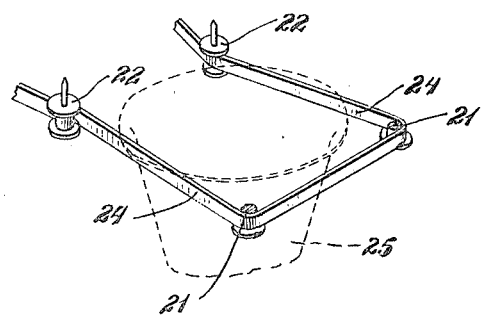
Fig. 8 is a perspective view of one of the elastic cone supporting elements.
Figure 9:
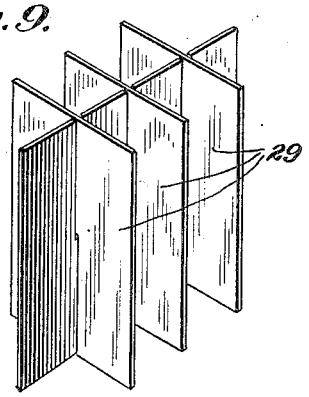
Fig. 9 is a fragmentary perspective view of the partition members that separate the series of cones.

My ice cream cone dispenser may be constructed of any desired material, metal preferred. The apparatus comprises a properly proportioned substantially rectangular casing 10 which has its top open but normally closed by a hinged cover 11 that is flanged to embrace the sides and face of the casing. A suitable latch 12 may be provided for holding the cover closed. The front of the casing 10 has its upper portion provided with a transparent plate 13, and the portion of the casing covered by the said transparent plate provides the cone receiving compartment 14 of the device. The upper compartment, at the bottom thereof has secured to the side walls a longitudinally arranged dividing strip 15, the said strip being substantially V-shaped in cross section. The closed back 16 of the casing is provided with a transverse opening 17. The lower wall 18 provided by the opening 17 is in a line with the lower wall of the dividing strip 15 and also in a line with the lower wall is a longitudinally arranged cleat 19 that is secured to the inner face of the panel 20 which forms the lower supporting member for the transparent plate 13. On the under face of the cleat 19 there are disposed depending headed members 21 that are arranged in pairs. On the under face of the dividing strip 15 there are similar headed members 22 also arranged in pairs. The pairs of the headed members 22 are disposed nearer each other than the pairs of the headed members 21. On the lower wall 18 provided by the opening 17 there are upstanding pins 23 which are also arranged in pairs and which are spaced away from each other a distance approximately the distance between the spaced pairs of the headed members 21. Around the pairs of headed members 21 and around the pairs of pins 23 are endless elastic elements 24. The side members of each of the elastic elements contact with the inner faces of the headed members 22 on the dividing strip 15. The strip 15, it is to be noted divides the upper compartment into a front and a rear portion, and the portions of the elastic elements received between the divisions have their longitudinal sides inclined toward the inner ends of the said portions and between these side members of the elastic elements the cones 25 are received and supported in a manner which permits of the ready removal of the lowermost cones.

The opening 17 in the back 16 of the casing is normally closed by a plate 26. This plate has its lower edge provided with orifices 27 corresponding in number with and arranged to receive the pins 23 and thus, when the plate is arranged to close the opening, compress the elastic elements and properly hold the same in cone supporting position. The plate 26 is latched to the back of the casing as indicated by the numeral 28.

As is well known in the art to which this invention relates, the cones are packed in cartons by the manufacturer, the series of cones in the cartons being divided from each other by paste board partitions 29. In arranging the cones in the cone compartment of my improvement one end of the carton is opened and the carton is bodily inserted through the open top of the casing so that the lower series of cones 25 will be received between the arms or the sides of the elastic elements 24 to support all of the cones. The carton is then removed from the casing, but the partition 29 is allowed to remain in the casing. It may be well to state that ice cream cones have their mouth portions flared outwardly which permits of the elastic members maintaining a firm grip thereon. It will be apparent that either the inner or outer rows of cones may be separately removed from the device by merely exerting a downward pull on the cones which project into the open and lower compartment 30 of the casing.

As the upper cone receiving compartment is provided with a substantially open bottom, it is essential that when the device is not in use the cones should be protected from the deteriorating effect of the air as well as from dust, vermin, etc. Therefore I arrange in the lower compartment a closure plate 31 for the bottom of the upper compartment. On the ends of the plate 31, which it should be stated fits snugly in the lower compartment, there are secured upstanding rods 32. These rods are received in vertical grooves 33 in the side members of the casing 10, extending through both the lower and upper compartments. The rods provide guide members for the closure plate, and the said closure plate has a central notch upon its outer face at its lower corner which provides a finger hold 34 whereby the plate may be raised. In elevating the plate the same will, of course, contact with the projecting cones and will elevate the cones into the upper display compartment. On the plate 31 there is a latch 35 which coöperates with the keeper 36 in the back 16 of the casing 10 so that the said plate will be locked when elevated to close the upper compartment. The opening in the lower compartment is disposed directly below the transparent plate in the upper compartment, in the showing of the drawings, but if desired both of the faces of the lower compartment may be provided with openings so that the cones may be removed from either side thereof.

It is thought from the foregoing description, when taken in connection with the drawings that the simplicity of the construction as well as the advantages thereof will present themselves to those skilled in the art to which such inventions appertain without further detail description, it being merely necessary to add that the foregoing description and the accompanying drawings illustrate a satisfactory manner in which my improvement may be reduced to practice, but it should be understood that such changes may be made therefrom as regard proportion, size and other details of construction which fall within the scope of what is claimed. It is thought well to emphasize the fact that with my improvement original packages which contain one hundred cones may be readily inserted in the device, and also that any desired number of cones may be removed at the same time.

Having thus described the invention, what I claim is:—

1. In an ice cream cone dispensing apparatus, two vertically disposed communicating compartments, the upper compartment designed to receive nested cones, a hinged closure for the top thereof and a transparent plate on one face thereof, a plate arranged longitudinally in the compartment below the transparent plate, a longitudinally disposed dividing strip centrally in the compartment at the bottom thereof, elastic means connected to the strip and to the back of the compartment, means on the strip engaging said elastic means for spacing the same, and said means designed to resiliently engage with the lower corners, and the bottom compartment having an opening to permit of the removal of the cones.

2. In an ice cream cone dispensing apparatus, a casing divided into two vertically disposed communicating compartments, a hinged door closing the top of the upper compartment, a transparent plate on the face of the upper compartment, a longitudinal cleat below the plate, a longitudinally disposed dividing strip in the center of the compartment at the lower end thereof, the back of the compartment having an opening therein and the lower wall thereof being provided with upstanding pins arranged in pairs on the cleat, headed members arranged in pairs on the strip, continuous elastic elements arranged around the pairs of headed elements and pins, and said elastic elements operating the lower cones, a closure plate for the opening in the back of the compartment, the opening having orifices therein to receive the pins, latch means for the plate, and the lower compartment having an opening for the removal of the cones.

3. In an ice cream cone dispensing apparatus two vertically disposed communicating compartments, the upper compartment having cones therein, the lower compartment having an opening to permit of the removal of the cones, elastic means between the compartments supporting the cones, a vertically movable plate in the lower compartment, guide means therefor, said plate when moved in an upward direction designed to close the communication between the compartments, and latching means for the plate when the same is in the last mentioned position.

In testimony whereof I affix my signature.

HAROLD G. WILSON.